United States Patent
Villatte

[11] Patent Number: 6,145,547
[45] Date of Patent: Nov. 14, 2000

[54] PIPES FOR PIPELINES WITH HEAT INSULATING DOUBLE CASING

[75] Inventor: Ludovic Villatte, Nanterre, France

[73] Assignee: ITP, Louveciennes, France

[21] Appl. No.: 09/147,062

[22] PCT Filed: Mar. 28, 1997

[86] PCT No.: PCT/FR97/00564

§ 371 Date: Sep. 29, 1998

§ 102(e) Date: Sep. 29, 1998

[87] PCT Pub. No.: WO97/37166

PCT Pub. Date: Oct. 9, 1997

[30] Foreign Application Priority Data

Mar. 29, 1996 [FR] France .................................. 96 04812

[51] Int. Cl.[7] .................................................. F16L 9/14
[52] U.S. Cl. ...................... 138/149; 138/112; 138/148
[58] Field of Search .................................. 138/106, 112, 138/149, 148

[56] References Cited

U.S. PATENT DOCUMENTS

| | | | |
|---|---|---|---|
| 3,863,679 | 2/1975 | Young ..................................... | 138/106 |
| 3,903,928 | 9/1975 | Sykes et al. ............................. | 138/112 |
| 3,937,617 | 2/1976 | Yaguchi .................................. | 138/112 |
| 3,961,907 | 6/1976 | Close et al. ............................. | 138/112 |
| 4,500,487 | 2/1985 | Christie et al. .......................... | 138/149 |
| 4,700,751 | 10/1987 | Fedrick ................................... | 138/104 |
| 4,718,459 | 1/1988 | Adorijan ................................. | 138/106 |
| 4,768,455 | 9/1988 | Maxson et al. .......................... | 138/149 |
| 4,874,648 | 10/1989 | Hill et al. ................................. | 138/149 |
| 4,930,546 | 6/1990 | Kawamura et al. ..................... | 138/149 |

*Primary Examiner*—James Hook
*Attorney, Agent, or Firm*—Oblon, Spivak, McClelland, Maier & Neustadt, P.C.

[57] ABSTRACT

A line pipe with a double casing is especially used in transporting oil products. In a preferred embodiment, such a pipe is characterized in that, in a sealed annular space, located between an inner tube and an outer tube both coaxially arranged inside each other, there is included a self-sustaining plate made of open pore-microporous material, which is flexible enough to be externally wound around the inner tube. This plate is preferably less in thickness than said annular space such that a passageway is left free between the former and the outer tube whereby low pressure is maintained.

16 Claims, 1 Drawing Sheet

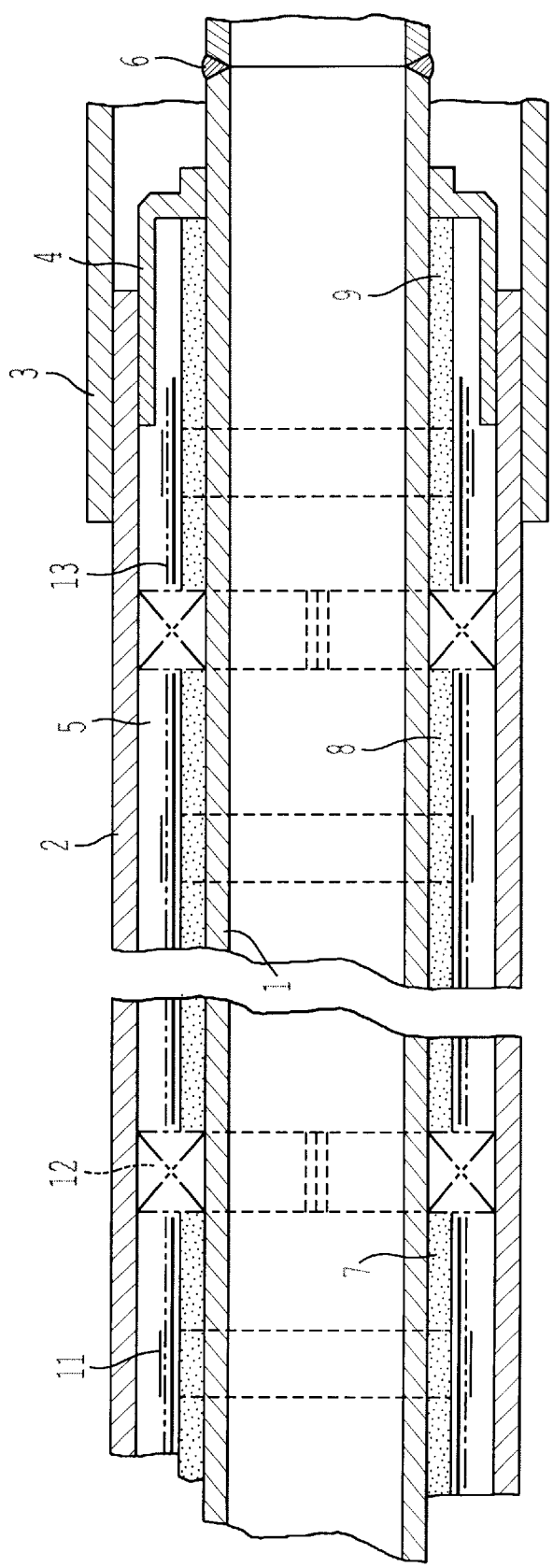

PIPES FOR PIPELINES WITH HEAT INSULATING DOUBLE CASING

BACKGROUND OF THE INVENTION

1. Field of the Invention

The present invention relates to the design and manufacture of double casing pipes, such as in particular pipes from which pipelines are assembled by joining sections end to end, or those which are more specifically built and assembled into pipelines to be laid on the bottom of the oceans, for the purpose of transporting oil products, in the liquid or gaseous state.

For this or other similar industrial applications, the invention provides improvements in pipes which are generally equipped with a heat insulating double casing so as to provide a sealed annular space between two coaxial tubes.

2. Description of the Related Art

One recurrent problem involved in the manufacture of such pipes arises from the need to achieve good heat insulation between the inner portion and outside environment of the pipe, at least at certain periods during the service lifetime of a pipeline assembled therefrom. By way of illustration, submarine pipeline used to transport oil products are as a matter of fact subjected to cold temperatures at the seabed level (usually between 0° and 20° C.), whereas the fluids being carried need often be at relatively high temperatures (in the range of 100° to 200° C. according to current specifications). Even though temperature may decrease for a production field in the course of time, the fluid temperature must not drop below a minimum value (say 40° C.) before it reaches its final delivery site located at the end of the pipeline, in order to prevent the formation of solid deposits.

In addition, distances being covered are significantly high and are expressed in tens of kilometers. It is essential that the heat insulation capacity last as so many years as the pipeline is in service. Among other requisites from a practical standpoint, it might be stressed that heat insulation capacity should not be adversely affected by the assembling operations into pipelines during which submarine pipes are sequentially joined end to end, nor during the laying process of the resulting pipeline, which is gradually lowered into the sea, nor even from transport between a pipe production line or facility and the site where the pipeline is actually installed.

Other limitations arise from the process of pipe production, inevitable dimensional tolerances which are inherent to tubes, depending on their nature (typically steel) and their diameter (generally of between 100 and 700 mm), and to sealing treatments. One proposal considered by the oil industry to circumvent the above problem resides in generating high vacuum within the annular space located between the two coaxial tubes of a double casing pipe. In this case, it is evident that a good seal is critical to achieve and that both the required vacuum and the thickness compatible therewith result in the pipe cost being undesirably increased.

Similar heat insulation and durability requirements hold true for other applications, notably for conditions where a temperature differential of the same range is otherwise found between the inner and the outer portion of the pipe along the opposite direction.

SUMMARY OF THE INVENTION

In order to cut expenses and improve the standard and durability of heat insulation, there is provided according to the invention a pipe with a heat insulating double casing, which is characterized in that, within a sealed annular space lying between an inner tube and an outer tube being coaxially arranged inside each other, it comprises a self-sustaining plate of an open pore-microporous material, which is flexible enough to be circumferentially wound along the inner tube, and in that there is provided outside said material in said annular space, a free passageway for longitudinal gas flow enabling low pressure to be maintained throughout said annular space.

In a preferred embodiment of the invention, such a passageway is in the form of a ring-shaped layer which is left free between the microporous material plate and the inner wall of the inner tube.

This embodiment is especially adapted to pipes which require during fabrication the insertion of an inner tube (which has been previously equipped with microporous material plated thereon) inside a preformed outer tube. This generally applies to pipes using steel tubes to delimit a double casing.

Alternatively, it may prove more convenient to form the outer tube by continuous plating against the microporous material, or by setting on site of a given material such as an organic resin composition, being applied to the microporous material by spraying, dipping, extrusion, or the like. In such a case, it may prove impractical to provide an annular layer which freely allows longitudinal gas flow. Such a layer may be namely replaced by tubing inserted on top of the microporous material, before covering the whole structure for instance with a plastic-made coating, or by taking care not to seal the microporous material-derived plate in an edgewise fashion, so as to maintain a free passageway along said pipe generating line.

A highly suitable material for pipes of the instant invention is exemplified by ceramic-based microporous insulating plates, especially silica-based such as of the type which is commercially available and sold by Micropore International Ltd. under the tradename Microtherm.

The material from which these plates are built consists of a mixture of silicious powder and ceramic reinforcing fibers, such combination being compacted into a coherent three dimensional structure of fine particles which is enclosed into a nontight casing. The latter is typically comprised of mineral fiber tissue which is bonded to form a nonwoven fiber crossnetwork, especially of glass fibers. However, it would be cheaper to use instead for the purpose of the present invention a cotton tissue, including here cotton fibers bonded together into an essentially nonwoven structure.

From a chemical point of view, this consists, as far as the silicious microporous structure is concerned, (excluding the casing), of a mixture containing a major portion of silica together with a minor portion of titanium dioxide.

In applications persuant to the invention of this type of insulation plates, the presence of titanium dioxide confers no the microporous material an anti-radiant effect which is put to advantage nearby the inner tube, namely that one which is subject to high temperatures within pipelines. In this regard, it is worth mentioning that microporous materials are now readily manufactured from pyrogenated silica gel wherein the proportion of titanium dioxide exceeds 20% by weight based on total weight, up to 30 to 35% by weight of silica, disregarding minor portions of other mineral oxides which represent all combined at least 5% by weight.

These materials are further advantageous for the purpose of the present invention in that they are characterized by an "open" porosity and a pore diameter less than or not exceeding 0.1 micron (μm). Those skilled in the art will recognize that porosity is said to be open where open intercommunicating pores represent essentially all pores contained in the microporous structure, that is in practice in the range of 85 to 95% by volume based on total pore volume, which is itself close to 80% of apparent volume.

All applications which have been recommended to date for microporous materials having silicious particles as primary constituent, mainly pyrogenated silica gel, make use of the fact that the diameter of open pores is less than what is needed for air molecules to freely flow, thus insuring a heat insulation capacity well above that of conventional materials, in particular those which are so produced to provide essentially closed pores.

Unlike those familiar applications, the present invention results in a further improvement in performance by taking advantage of the fact that pores are open to allow generation of a partial vacuum, throughout the material being considered.

Accordingly, the invention allows selection of microporous material thickness values in a range which achieves the required insulation capacity while meeting economic limitations related to pipeline manufacture and assembly, irrespective of the high intrinsic cost of the material itself.

Simultaneously, one result achieved by the invention is that partial vacuum will prove sufficient resulting advantageously in a reduced pressure of between 0.5 mbars and 100 mbars. These conditions are much easier to fulfill, coupled with a substantial reduction in cost, than high vacuum levels previously recommended for pipes with a double heat insulation casing.

By increasing, inter alia, the average length of pathway left free for gas molecular motion as a result of the invention, one is able to increase the insulation capacity two to ten folds, as a function of the actual reduced pressure used and depending on heat conditions on site.

A striking feature of the invention is that the space occupied by the microporous material within the annular space between the two coaxial tubes maintains a free passageway for laminar air flow thus promoting suction and generating reduced pressure from one section to another through the entire pipe as applied from one end thereof. Furthermore, the seal requirements become as a result less stringent, thereby simplifying production and transport operations that pipes undergo to the pipeline installation site and resulting moreover in cost savings.

In general, it is observed that an annular space measuring as few as 0.5 to 5 mm in mean thickness which is left free along the outer tube by the microporous material is enough to drive out efficiently through applying reduced pressure the air initially contained in the pores of the microporous insulating material. This is ascribed to the suction effect which proceeds radially across the microporous material at each cross section of the pipe, while air readily flows lengthwise along the space which is left free.

The useful thickness of this annular space turns out to be comparable to measure changes due to dimensional tolerance admitted during manufacture of the pipes themselves and to comply with technical requirements relative to the manufacture of such pipes that is by fitting a prefabricated outer tube externally around an inner tube provided with a casing formed by the plate of microporous material.

Another important benefit of the present invention is that the heat transfer coefficient jointly achieved by use of a microporous material and reduced pressure generation, both in the microporous material itself and across the thickness corresponding to the free annular space lying between the coaxial tubes, allows substantial reduction of the overall thickness of the annular space, and correspondingly a reduction of the outer tube dimensions for a constant useful section of the inner tube and identical heat insulation requirements.

It will be appreciated that a microporous material measuring 10 mm in thickness is enough to comply with requirements regarding pipelines used to transport oil products along the seabed in a number of practical applications. In other cases, this thickness may be conveniently increased to lie in the range of 5 mm to 30 mm, and preferably in the range of 10 mm to 20 mm.

Practically speaking, however, there are conditions where the annular space thickness between the two coaxial tubes cannot be reduced below 10 to 15 mm for other technical considerations, especially to allow access of welding machines used to hermetically seal the annular casing at terminal regions of the pipe and/or allow sealing to be conducted by means which do not result in excess heat transfer between tubes. Namely, the microporous plate thickness is suitably chosen to represent 30 to 95% of the annular space between the two coaxial tubes, said range lying preferably between 50 and 80%. In such a condition, it is contemplated that the inner diameter of the outer tube is often 25 to 50 mm greater than that of the inner tube outer wall.

In the aforegoing section and the following description, reference is made to a preferred application of the invention wherein individually prefabricated pipes are transported to the pipeline installation site, where the latter is assembled by edgewise joining of successive pipes. On the other hand, reference is especially made to those pipes wherein both coaxial tubes are metal tubes which are fitted inside each other before sealing the intermediate casing at both ends of the pipe.

In this connection, it shall be noted that the use of an in-between ferrule, with a sealed double connection, on one hand to the inner tube, and on the other to the outer tube, at each terminal portion of the prefabricated pipes, is mainly justified when these pipes are of relatively short length, for example 12 m or 24 m, whereas for pipes of greater length, it will be easier to disregard potential minor heat leaks which might occur at connection sites between endwise welded tubes. Such a ferrule is preferably metallic in structure and fixed by welding while in other cases, use may advantageously be made of an elastomeric ferrule which is adhesively secured on each tube.

Since high temperatures to be withstood by the microporous material typically lie in the range of 100° to 200° C., hence well below temperatures found in applications for this type of material, it is convenient to substitute the nontight casing enclosing the silicious material itself by a cotton fiber tissue rather than by those made from glass fiber or other ceramic fiber. The term tissue, as used herein, is intended to include networks in which fibers are not actually interwoven and which are currently referred to as nonwoven fabric.

Moreover, benefit is derived by using this type of heat insulant in the form of parallel plane strips held together by the casing tissue, whereby strips are longitudinally arranged on the inner tube of the pipe herein disclosed. More frequently, however, it will be more advantageous to avoid heat bridge formation along the pipe generating lines by winding around the inner tube a single plate of constant thickness having both edges joined.

In fact, considering useful thickness values according to the invention and the diameters of tubes relevant in practice to pipelines of interest, the plates of microporous material which are commercially available as planar plates have enough flexibility to be intimately wound around the inner tube or plated thereon with no trouble.

As stated above, the plates of microporous material are nevertheless self-sustaining, which implies in general that they need not be fixed at their edges along a generating line of the inner tube and hence it will prove sufficient and preferable to sequentially perform edgewise connection by self-adhesive strips in particular.

From the above and the description which follows, it will be appreciated that the invention takes advantage of the particular features of silica-based insulation plates in terms of open pore microporosity and flexibility within useful dimension ranges rather than their capacity to resist very high temperatures by virtue of their ceramic constitution.

As a result, those skilled in the art are able to select equivalent materials, without departing from the scope of the invention. In this respect, use may be made in particular of polymeric organic resin-derived microporous materials, rather than mineral compounds, or materials made from compositions having incorporated therein variable proportions of homogenous fine particles or fibers such as found in felts.

In addition, reduced pressure needs not be generated under air environment. In contrast, it might be more convenient to replace any air remaining by other gas, such as argon, using a flushing process, a process which, once again, does not require high vacuum generation.

According to one secondary feature of the invention, there is provided external to the plate of microporous material a lining protection foil capable of preventing any dammage that might occur during fitting of the coaxial tubes inside each other. A preferred example of such a foil is one made of organic material, basically derived from a polyolefin resin such as polyethylene.

This foil can be firmly applied to the microporous material either by making use of its tendency to shrink, or by vacuum effect taking care to avoid foil bulge formation and jamming when fitting a preformed outer tube externally along the inner tube surrounded with plates of microporous material.

Under some occasions, it would be highly advantageous to use a foil having a low surface friction factor, especially on the side facing the outer tube, in order not to interfere with slight repositioning of components due to self winding of the pipe and its unreeling at an installation site of the pipeline assembled therefrom.

For other uses, application of a foil made from a different material on the outer surface of the microporous material might be preferred, especially an aluminium foil the outer surface of which acts to prevent radiant heat transfer.

Likewise, it might be convenient to line the inner tube with an anti-radiant layer beneath the microporous material. However, it is generally believed that no extra cost will be incurred by virtue of efficient insulation provided by the invention since these layers are no longer needed.

According to still another feature of the invention, there is provided with advantage spacers aimed at centering the inner tube inside the outer tube by maintaining an adequate minimal gap between the inner and the outer tube sequentially from one portion to another through the entire length of the pipe. Such spacers typically consist of half-shells held together in position on the inner tube of the pipe.

Within the scope of the invention, such spacers need generally not be arranged on top of the microporous material, but may be directly mounted instead on the inner tube in a stable position, so as to simultaneously form a longitudinal abutment or stop interposed between two plates of microporous material sequentially arranged along the whole pipe.

BRIEF DESCRIPTION OF THE DRAWINGS

The different characteristics of the invention will become more apparent together with their respective benefits from the disclosure of an embodiment example with follows, made by reference to the FIGURE which is the sole drawing herein enclosed.

DETAILED DESCRIPTION OF THE INVENTION

This FIGURE is a longitudinal partial cross section of a double casing pipe according to the invention, which hence comprises an inner tube 1 coaxially fitted inside an outer tube 2, in the form of a prefabricated item delivered from a production facility to be transported to the installation site where identical pipes are sequentially joined end to end to form a submarine pipeline.

There is schematically outlined a sleeve 3 which is additionally mounted at the joint portion between two pipes welded endwise along their respective inner tubes 1.

There is also shown an intervening ferrule 4, positioned at both ends of the tube which defines a sealed annular space 5 therebetween comprised between two individual tubes.

This ferrule 4, of a substantially conical shape, which forms a so-called terminal hub as known in the art, is hermetically welded at one side of the inner tube 2, so as to leave a sufficiently large portion thereof exposed to achieve a welded connection 6, as well as terminally from within behind the outer tube 2.

Referring to the same FIGURE, there are shown plates of microporous material 7, 8, 9 which are circumferentially wound on inner tube 1 and dimensioned in order that opposite edges join along a generating line of said tube, as well as straps or collars 11, merely consisting of self-adhesive paper strips, to bond adjacent edges together in intimate contact with the outer wall of the outer tube 1.

Also shown, in a lengthwise arrangement along the pipe, are plates 7, 8 and 9 spaced apart by spacers 12 being interposed therebetween. These consist of half-shells securely fixed together and firmly applied on inner tube 1. These shells mainly consist of a cast organic material. The outer diameter thereof is less than the inner diameter of outer tube 2, so as not to interfere when fitting tubes 1 and 2 inside each other irrespective of variations in wall thickness and roundness which are usually tolerated during manufacture of such tubes.

Spacers 12 thus obtained have both a crosswise centering function of tube 1 inside outer tube 2 and a locking function between successive plates of microporous material along a longitudinal direction. These plates further constitute mechanical reinforcing elements directly transmitting to the inner tube rather via insulating plates bending strain applied on the pipe during offshore installation.

In the embodiment example set forth herein, the microporous material is comprised of a heat insulating plate based on pyrogenated silica gel being enclosed within a cotton tissue casing.

More specifically, reference is made to a plate produced by Micropore International Ltd. Company under the tradename Microtherm, wherein a silica-based microporous structure contains approximately 65% of silica and about 32% of titanium dioxide, the balance of the composition being comprised on a weight basis of alumina and trace contents of different other metal or alcali-earth metal oxides, essentially derived from alumina silicates of which silica particle crosslinking fibers are composed.

Referring again to that particular example, the thickness of the microporous plate fills one half of the annular space 5 located between the two coaxial tubes.

For a thickness of 15 mm and an annular space of 30 mm around inner tube 1 of a typical thickness (13 mm) to match a fluid passageway section of 430 mm in diameter, a comparable thickness of air volume is maintained free nearby outer tube 2.

Partial vacuum aimed at dislodging air contained in open pores of the microporous material through the encasing tissue is convenienlty accomplished by longitudinal gas flow in this empty space. Vacuum is generated until a reduced pressure on the order of 50 millibars is obtained, through suction by a temporary flow tap communicating with a hole drilled at one end of the pipe, which hole is subsequently plugged by a weld joint.

Typically, tubes 1 and 2, as well as end ferrules 4, of an essentially conical shape, are made from steel.

Inner tube 1 may suitably comprise an additional coating along its outer wall so selected to have characteristics which counteract any longitudinal sliding of the microporous material plated thereon. Alternatively, or in addition, it might be of interest, more particularly in assembling procedures, to adhesively secure the edges of each plate of microporous material at their connection site, throughout a generating line of the inner tube.

Additionally, there is depicted on this FIGURE an intermediate foil 13 which is externally wound around each insulating plate 7, 8, 9 of microporous material. It is aimed at protecting the tissue casing of the structure from dammage thereto when the external tube is fit on the inner tube previously provided with said plates and spacers 12.

As shown, this foil 13 is comprised of an organic substance sheet having an outer aluminium coating. However, it would be wiser to use a polyethylene foil of 0.2 mm in thickness adhesively sealed along a generating line of the pipe. Use of a shrink foil has the benefit of efficiently coupling the insulating plate to the inner tube in terms of mechanical vibration.

According to one practical embodiment example of the pipes herein depicted and set forth, in the form of prefabricated items as delivered from a production line, the portion of each pipe is typically comprised of an inner tube 1 having an outer diameter of 219 mm and a wall thickness of 13 mm and of an outer tube 2 having an inner diameter of 249 and a wall thickness of 11 mm.

Concerning each pipe, the outer tube is fitted around the inner tube already having fitted thereto spacers 12, and plates of microporous material 7, 8, 9, each having a constant thickness of 12 mm, for a width equivalent to the circumference of the inner tube and a length of 40 cm. This material displays a porosity of 90% void space, essentially comprised of open pores of a mean diameter less than 0.1 $\mu$m and a specific gravity of 255 kg/m$^3$.

One proceeds then with vacuum generation using the layer of 3 mm mean thickness that has maintained free nearby the outer tube, to achieve a reduced pressure of 50 millibars, as mentioned previously.

The same layer, which allows longitudinal gas flow and partial vacuum generation crosswise within the microporous material, may subsequently have another application, once successive pipes are joined to form a submarine pipeline.

This will now be illustrated by reference to a pipeline alternatively built from a pipe according to the invention. Namely, the pipe is built in extended lengths at the production site and transported in a self wound state to the installation site, again optionally located offshore.

Whether successive tubes are joined or not, a whole pipe is in the form of a single piece, provided with an annular space throughout for heat insulation.

Once such a pipe is installed, the gas flow passageway may still be accessed from either end of the pipeline to vary the vacuum strength during service lifetime thereof, and hence vary the efficiency of insulation.

This option proves to be highly useful in oil extraction, because the effluents of a production field vary in temperature as exploitation of wells proceeds in time, as well as in terms of other operating parameters, such as flow speed and both chemical and physical composition of the effluent being carried through the pipeline.

In a practical example, heat insulation efficiency is initially adjusted to a relatively low value, early in production where the effluent enters the pipeline at 150° C. for instance. Achieving an overall heat transfer coefficient on the order of 2 to 5 W/m$^2$ per ° C makes it possible to restrict longitudinal expansion of the inner tube, while maintaining an effluent temperature of at least 40° C. until the fluid leaves the pipeline.

When the field goes into final stages of production, the effluent temperature at the pipeline input substantially drops, such that it becomes useful to minimize the overall heat transfer coefficient, to 0.5 W/m$^2$ per ° C., to maintain the same temperature at the pipeline's output, so as to achieve an acceptable compromise between economic requirements and the need to avoid undesirable formation of solid deposits along the entire course of the effluent travelling through the pipeline.

In such conditions, it is recommended to select, dimension and arrange the different components of the pipe of the invention in a convenient manner to obtain an overall heat transfer coeffficient comprised between 0.5 W /m$^{2.\circ}$ C. and 1 W/m$^{2.\circ}$ C. when the pipe double casing is subjected to a depression on the order of 1 to 100 mbars, which optionally might not exceed a low pressure value of about 900 mbars, and in order to exploit any presence of lengthwise passageways for free air flow to generate an overpressure by contrast, the pressure in the annular space located between the coaxial tubes (including the microporous material) being then as high as 50 bars for example.

In such an example, there is contemplated according to the invention a method for using a pipe thus made, essentially characterized in that pressure maintained within said annular space is varied between values as high as 50 bars early in service, and values in the range of 1 mbars and 900 mbars late in service for a pipeline formed from said pipes. One could hence vary the overall heat transfer coefficient between 0.5 W/m$^{2.\circ}$ C. and 5 W/m$^{2.\circ}$ C., for a microporous plate thickness on the order of 10 to 14 mm and an annular layer for longitudinal gas flow having a radial thickness of between 1 and 5 mm.

In both cases, air which is to fill the annular space, including the pores of microporous material, can be substituted by some other gas, such as an inert gas like argon, in order to further improve the desired qualitative characteristics, using structural components of identical composition and measures.

What is claimed is:

1. A heat-insulating double casing pipe to be especially used in offshore oil pipelines, characterized in that, in an annular sealed space located between an inner tube and an outer tube, both coaxially arranged [in side] inside each other, there is included a self-sustaining plate made of an open-pore microporous insulating material, which is flexible enough to be wound around the inner tube, and in that there is provided outside said microporous insulating material within said annular space, a free passageway to allow longitudinal gas flow, whereby low pressure below 100 millibars is maintained throughout said annular space.

2. A pipe according to claim 1, characterized in that said passageway is in the form of an annular layer which remains free between the plate of microporous material and the inner wall of the outer tube, said plate being less in thickness than said annular space.

3. A pipe according to claim 2, characterized in that the layer which is left free along said outer tube by the plate of microporous material has an average thickness ranging from 0.5 to 5 mm.

4. A pipe according to to claim 1, characterized in that said low pressure is between 0.5 and 100 millibars.

5. A pipe according to claim 1, characterized in that said microporous material is in the form of ceramic-based insulation plates arranged throughout the pipe.

6. A pipe according to claim 5, characterized in that said microporous material consists of a mixture containing a major portion of silica together with a minor portion of titanium dioxide.

7. A pipe according to claim 5, characterized in that the material of said plates consists of a mixture of silicious powder and ceramic reinforcing fibers, said combination being compacted into a coherent three dimensional structure made up of fine particles which is enclosed inside a nontight casing.

8. A pipe according to claim 7, characterized in that said casing consists of a cotton fiber tissue, preferably of a nonwoven type.

9. A heat-insulating double casing pipe to be especially used in offshore oil pipelines, characterized in that, in an annular sealed space located between an inner tube and an outer tube, both coaxially arranged inside each other, there is included a self-sustaining plate made of open-pore microporous material, which is flexible enough to be wound around the inner tube, and in that there is provided outside said material within said annular space, a free passageway to allow longitudinal gas flow, whereby low pressure is maintained throughout said annular space;

characterized further in that the portion of open pores in the material forming said plate is 85 to 95% based on total pore volume, with an average pore diameter less than or equal to 0.1 μm.

10. A pipe according to claim 9, further comprising:

centering spacers positioned between said inner tube and said outer tube, regularly arranged in a tight fit on said inner tube throughout the pipe, said spacers forming reinforcing elements and longitudinal thrust-blocks for individual plates of said microporous material.

11. A pipe according to claim 9, further comprising:

a foil for protecting said plate, said foil being circumferentially applied around said plate and having a low surface friction factor.

12. A pipe according to claim 11, characterized in that said foil is made of shrink material that promotes mechanical vibration coupling of said plate to said inner tube.

13. A pipe according to claim 9, further comprising:

at least one anti-radiant foil, interposed between said inner tube and said outer tube and co-acting with said plate of microporous material and low pressure free passageway.

14. A pipe according to claim 9, wherein:

said outer tube is a steel tube which is fitted externally along an inner tube also made of steel, provided with said plate of microporous material, said annular space being subsequently hermetically sealed at both ends of the pipe by an intermediate ferrule located between said coaxial tubes.

15. A heat-insulating double casing pipe to be especially used in offshore oil pipelines, characterized in that, in an annular sealed space located between an inner tube and an outer tube, both coaxially arranged inside each other, there is included a self-sustaining plate made of open-pore microporous material, which is flexible enough to be wound around the inner tube, and in that there is provided outside said material within said annular space, a free passageway to allow longitudinal gas flow, whereby low pressure is maintained throughout said annular space;

characterized further in that said microporous material is in the form of ceramic-based insulation plates arranged throughout the pipe;

characterized further in that said microporous material consists of a mixture containing a major portion of silica together with a minor portion of titanium dioxide;

characterized further in that the portion of titanium dioxide present in said material is comprised between 30 and 35% by wt. for a silica content of 60 to 70% by wt., based on total weight of the composition thereof.

16. A method for using a heat-insulating double casino pipe to be especially used in offshore oil pipelines, during service lifetime of a pipeline made from said pipe, comprising the steps of:

varying pressure generated within an annular sealed space, located between an inner tube and an outer tube, between 50 bars and 1 mbar, in order to vary an outward overall heat transfer coefficient of said pipe in a range of 0.5 W/m$^{2\circ}$ C. to 5 W/m$^{2\circ}$ C.; and choosing a thickness of a self-sustaining plate made of an open-pore microporous insulating material in the annular sealed space to lie in a range of 10 to 14 mm so as to provide a longitudinal gas flow layer having a mean thickness in a range of 1 to 5 mm.

* * * * *